United States Patent
Wu

(10) Patent No.: US 9,588,368 B2
(45) Date of Patent: Mar. 7, 2017

(54) TOUCH DISPLAY PANEL

(71) Applicant: Shanghai Tianma Micro-Electronics Co., Ltd., Shanghai (CN)

(72) Inventor: Tianyi Wu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 175 days.

(21) Appl. No.: 14/014,948

(22) Filed: Aug. 30, 2013

(65) Prior Publication Data

US 2014/0022210 A1    Jan. 23, 2014

Related U.S. Application Data

(63) Continuation of application No. PCT/CN2012/085946, filed on Dec. 5, 2012.

(30) Foreign Application Priority Data

Jul. 20, 2012    (CN) .......................... 2012 1 0253996

(51) Int. Cl.
  *G06F 3/045*    (2006.01)
  *G06F 3/041*    (2006.01)
  (Continued)

(52) U.S. Cl.
  CPC .......... *G02F 1/13338* (2013.01); *G06F 3/044* (2013.01); *G06F 3/0412* (2013.01); *G06F 3/0418* (2013.01); *G02F 2001/134318* (2013.01)

(58) Field of Classification Search
  CPC ......... G02F 1/134363; G02F 1/136286; G02F 1/134309
  See application file for complete search history.

(56) References Cited

U.S. PATENT DOCUMENTS

2002/0158826 A1\* 10/2002 Hirota ............... G02F 1/134363
                                                                    345/87
2008/0122802 A1   5/2008 Furuhashi et al.
(Continued)

FOREIGN PATENT DOCUMENTS

CN    101556390 A    10/2009
CN    101571780 A    11/2009
(Continued)

OTHER PUBLICATIONS

European Search Report for European Application No. 12868921.3, mailed on Jun. 8, 2015, 6 pages total.
(Continued)

*Primary Examiner* — Alexander Eisen
*Assistant Examiner* — Nan-Ying Yang
(74) *Attorney, Agent, or Firm* — Alston & Bird LLP

(57) ABSTRACT

A touch display panel includes a color film (CF) substrate and a TFT substrate disposed opposite to each other, a liquid crystal layer disposed between the CF substrate and the TFT substrate. A common electrode having a comb-shaped structure and/or a pixel electrode having a comb-shaped structure are disposed on the TFT substrate close to the liquid crystal layer. The touch display panel further includes a touch layer disposed on the CF substrate close to the liquid crystal layer and having a driving line and a detecting line insulated from each other. The driving line and/or the detecting line have a comb-shaped structure that is at least partially misaligned with respect to the comb-shaped structure of the common electrode and/or the comb-shaped structure of the pixel electrode.

14 Claims, 10 Drawing Sheets

(51) Int. Cl.
*G02F 1/1333* (2006.01)
*G06F 3/044* (2006.01)
*G02F 1/1343* (2006.01)

(56) References Cited

U.S. PATENT DOCUMENTS

| | | | |
|---|---|---|---|
| 2009/0268132 | A1 | 10/2009 | Takama et al. |
| 2009/0273578 | A1* | 11/2009 | Kanda et al. ............... 345/174 |
| 2010/0321327 | A1* | 12/2010 | Liu ............................. 345/174 |
| 2011/0187677 | A1 | 8/2011 | Hotelling et al. |
| 2012/0169636 | A1 | 7/2012 | Liu |
| 2012/0249454 | A1* | 10/2012 | Teraguchi et al. ........... 345/173 |

FOREIGN PATENT DOCUMENTS

| | | |
|---|---|---|
| CN | 101930132 A | 12/2010 |
| TW | 201100909 A | 1/2011 |

OTHER PUBLICATIONS

1st Office Action as issued in corresponding Chinese Application 201210253996.8 on Jul. 2, 2015 (English language summary included).

Extended Search Report as issued in corresponding European Application 12868921.3 on Jun. 8, 2015.

\* cited by examiner

TOUCH DISPLAY PANEL

CROSS-REFERENCES TO RELATED APPLICATIONS

This application claims priority to and is a continuation of PCT/CN2012/085946, filed on Dec. 5, 2012 and entitled "TOUCH DISPLAY PANEL", which claims the benefit of Chinese Patent Application No. 201210253996.8, filed with the Chinese Patent Office on Jul. 20, 2012 and entitled "TOUCH DISPLAY PANEL", the contents of which are incorporated herein by reference in their entirety.

FIELD OF THE INVENTION

The present invention relates to the field of liquid crystal display technique, and in particular to a touch display panel.

BACKGROUND OF THE INVENTION

Liquid crystal has been increasingly applied in a display panel due to good electrical controllability of itself. For a liquid crystal display panel, among liquid crystal display modes, the twisted nematic (TN) display mode is most widely used. However, according to the display principle of this display mode, the viewing angle is limited. As a solution to this problem, it is known to dispose a pixel electrode and a common electrode on a same substrate and apply a voltage between the pixel electrode and the common electrode, so that an electric field substantially parallel to the substrate is formed and liquid crystal molecules are driven in a plane substantially parallel to the substrate. Transverse electrical field modes are known to include the In-Plane Switching (IPS) mode and the Fringe Field Switching (FFS) mode. In the IPS mode, a comb-shaped pixel electrode and a comb-shaped common electrode are combined for an arrangement. In the FFS mode, an upper electrode layer and a lower electrode layer are disposed on a same substrate with an insulating layer disposed between the upper electrode layer and the lower electrode layer. Specifically, one of the upper electrode layer and the lower electrode layer is used as the common electrode, and the other is used as the pixel electrode. Moreover, the upper electrode layer is set to in a comb-shaped structure etc., with slit(s) formed therein as an opening portion for making the electrical field pass through.

Currently, it is widespread that the liquid crystal is used in the touch display panel of a display (i.e. liquid crystal display, LCD), which allows a user to touch the touch panel with a finger or other object, so as to input information into a device which uses the display panel. Thereby, the dependence of the user on other input device (such as the keyboard, mouse, remote control, etc.) can be reduced or eliminated to achieve a convenience operation for the user.

Early touch display panel is the resistive type. The pressure at the contact position between the touch body and the display panel makes two conductive films contact with each other, so as to close a certain switch and send a touch signal. However, in the case where the resistive touch display panel is repeatedly pressed for a long time, the two conductive films may deform with the repeated pressing, and thereby the performance of the two conductive films may degrade or even the two conductive films may be damaged, which is prone to cause misjudgment of the touch signal. For the above-mentioned disadvantage, the capacitive touch display panel is proposed.

As shown in FIG. 1, the basic structure of the touch layer of the capacitive touch display panel includes: a dielectric material, two conductive films which are isolated by the dielectric material from each other, a driving line 11 is disposed on the lower conductive film and a detecting line 12 is disposed on the upper conductive film. In the case where there is no touch made by the touch body, the equivalent circuit of the touch layer is as shown in FIG. 2. Specifically, a capacitance $C_1$ is formed between the driving line 11 and the detecting line 12, and the driving line 11 and the detecting line 12 respectively has an equivalent resistance $R_2$ and an equivalent resistance $R_3$; the detecting line 12 is grounded via a resistance $R_1$; the driving line 11 and the detecting line 12 respectively has a parasitic capacitance $C_2$ and a parasitic capacitance $C_3$ with respect to other conductive layer(s) of the display panel; the parasitic capacitance $C_2$ of the driving line 11 is connected in series to the resistor $R_4$ and then grounded; and the parasitic capacitance $C_3$ of the detecting line 12 is connected in series to the resistance $R_5$ and then grounded. In this case, if an alternate current signal $I_0$ is applied to the driving line 11, the voltage $V_s$ of a corresponding signal will be detected from the detecting line 12. In the case where the touch body (such as a finger) touches the touch layer, such as the detecting line 12, as shown in FIG. 3, the equivalent circuit of the touch layer is as shown in FIG. 4. Specifically, the finger 12 applies a grounding capacitance $C_5$ to the detecting line 12, and the equivalent resistance of the finger is $R_6$. In this case, if the alternate current signal $I_0$ is still applied to the driving line 11, the voltage $V_s$ of the corresponding signal detected from the detecting line 12 will be smaller, since the resistance $R_6$, the grounding capacitance $C_5$ and the capacitance $C_1$ are connected in series sequentially. In summary, whether the touch layer is touched may be known according to the voltage detected from the detecting line 12.

Combining the above-mentioned IPS, FFS liquid crystal display and the capacitive touch display panel, the IPS, FFS liquid crystal display (FFS-LCD) touch display panel is formed and include(s): a color film (CF) substrate, a thin film transistor (TFT) substrate and a liquid crystal layer therebetween. The touch layer is disposed on the CF substrate. However, in the above-mentioned FFS-LCD touch display panel, the driving lines and the detecting lines are disposed all over the entire layer, and thus the driving lines and the detecting lines are completely overlapped with the upper electrode layer (the pixel electrode or the common electrode) having the comb-shaped structure respectively. The liquid crystal is filled between the driving and detecting lines and the upper electrode layer. The liquid crystal is equivalent to be the dielectric material, the driving lines and the detecting lines are equivalent to be one electrode plate, and the upper electrode layer having the slit(s) is equivalent to be the other electrode plate. Therefore, there may be parasitic capacitances existed between the driving lines and the upper electrode layer having the comb-shaped structure, and between the detecting lines and the upper electrode layer. As for the above-mentioned touch detecting method, the parasitic capacitance may cause the voltage $V_s$ detected from the detecting line to become smaller, therefore reducing the detection sensitivity of the touch display panel. For the IPS-LCD touch display panel, the driving lines and the detecting lines disposed all over the entire layer may also lead to parasitic capacitances existed between the driving and detecting lines and the common and pixel electrodes which are separated, thus reducing the detection sensitivity of the touch display panel.

Based on this situation, the present invention provides a touch display panel to improve the above-motioned problems.

BRIEF SUMMARY OF THE INVENTION

The object of the invention is to provide a touch display panel, so as to reduce the parasitic capacitances between the driving line and the upper electrode layer having the comb-shaped structure (or the common and pixel electrodes which are separated), and between the detecting line and the upper electrode layer, thereby improving the detection sensitivity of the touch display panel.

According to the invention, it is provided a touch display panel, which includes: a color film (CF) substrate and a thin film transistor (TFT) substrate disposed opposite to each other, and a liquid crystal layer disposed between the CF substrate and the TFT substrate, herein, a common electrode having a comb-shaped structure and/or a pixel electrode having a comb-shaped structure is disposed on the TFT substrate close to the liquid crystal layer, a touch layer is disposed on the surface of the CF substrate close to the liquid crystal layer, the touch layer includes a driving line and a detecting line which are insulated with each other, and the driving line and/or the detecting line has a comb-shaped structure which is at least partially misaligned with respect to the comb-shaped structure of the common electrode and/or the comb-shaped structure of the pixel electrode.

DETAILED DESCRIPTION OF THE INVENTION

Figure 1:
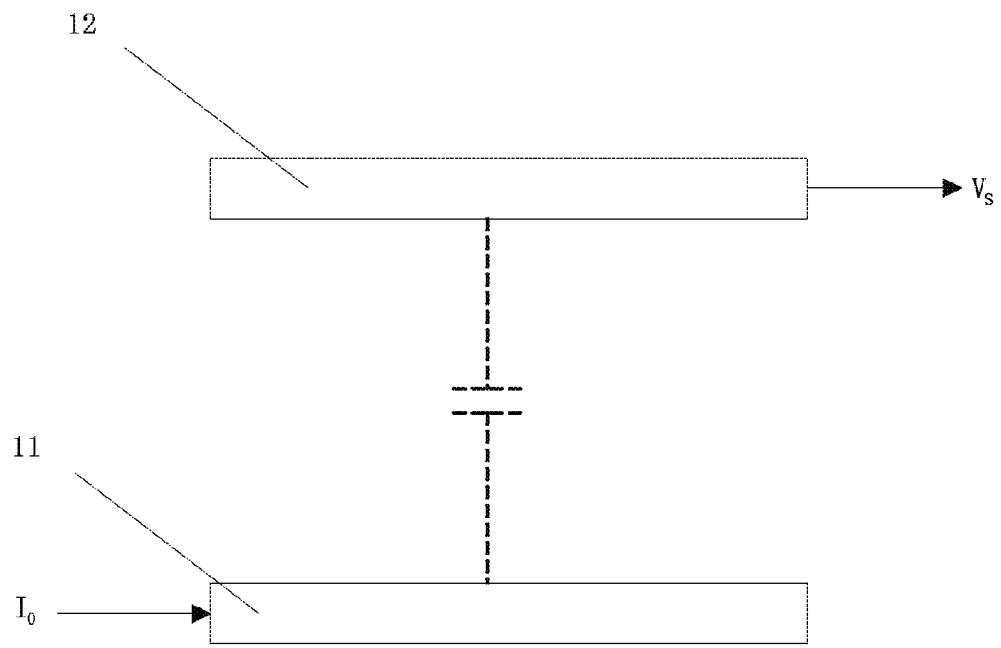
FIG. 1 is a structural diagram in the case where a touch layer of a capacitive touch display panel is not touched in the prior art.
Figure 2:
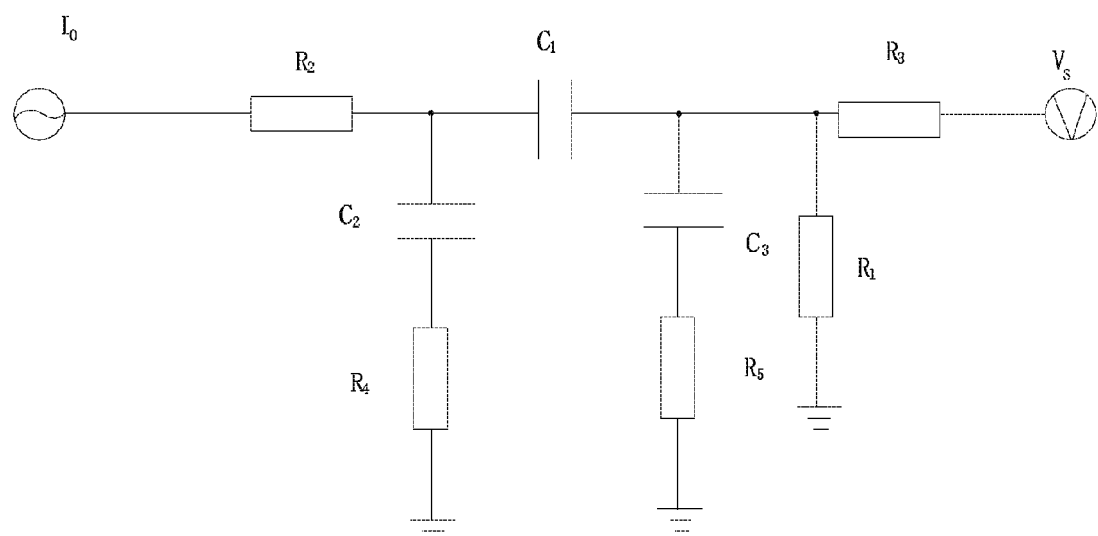
FIG. 2 is the equivalent circuit diagram of FIG. 1.
Figure 3:
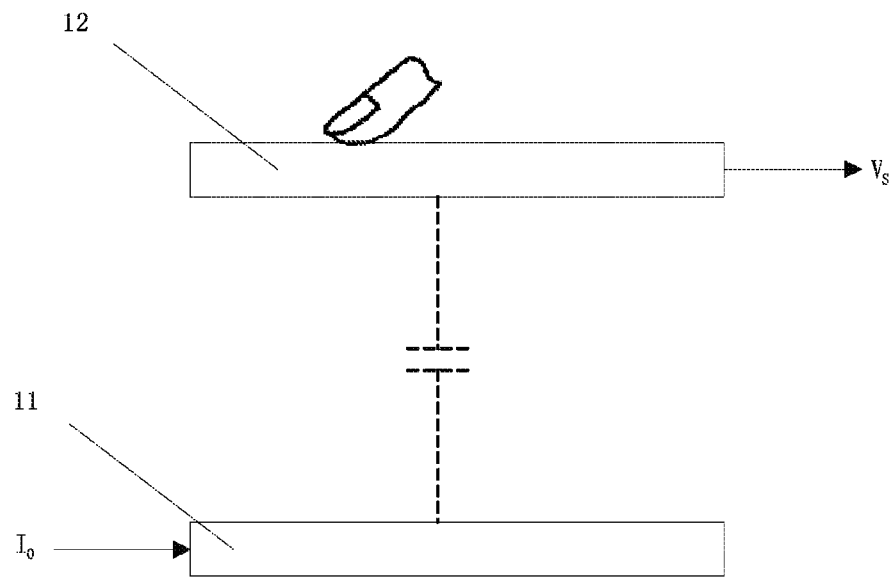
FIG. 3 is a structural diagram in the case where the touch layer of the capacitive touch display panel is touched in the prior art.
Figure 4:
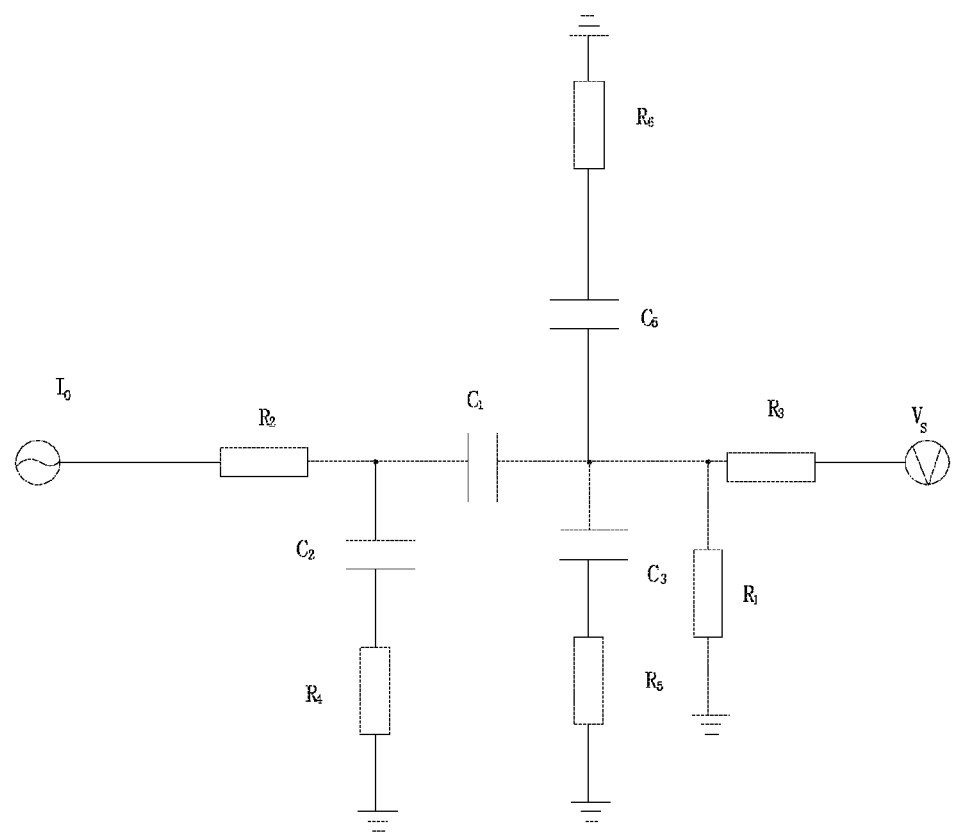
FIG. 4 is the equivalent circuit diagram of FIG. 3.

To make the above object, features and advantages of the invention more obvious and easy to be understood, in the following, particular embodiments of the invention will be illustrated in detail in conjunction with the drawings. The invention mainly focuses on the explanation of the principle and the accompanying drawings may not be drawn to scale.

For convenience in understanding the technical solution of the invention, all of the numerical references appeared in the invention are listed as follows:

| | |
|---|---|
| driving line 11 | detecting line 12 |
| CF substrate 2 | TFT substrate 3 |
| liquid crystal layer 4 | glass substrate 31 |
| electrode layer 32 | gate line 33 |
| data line 34 | pixel electrode 321 |
| bar portion of pixel electrode 3211 | comb-shaped portion of pixel electrode 3212 |
| common electrode 322 | bar portion of common electrode 3221 |
| comb-shaped portion of common electrode 3222 | protective film 35 |
| alignment layer 36 | driving line 22 |
| detecting line 24 | bar portion of driving line 221 |
| comb-shaped portion of driving line 222 | bar portion of detecting line 241 |
| comb-shaped portion of detecting line 242 | passivation layer 37 |
| insulating layer 38 | dielectric layer 23 |
| glass substrate 21 | |

First Embodiment

In the first embodiment, an IPS-LCD touch display panel which operates in the IPS liquid display mode is taken as an example to explain the technical solution of the invention.

Figure 5:
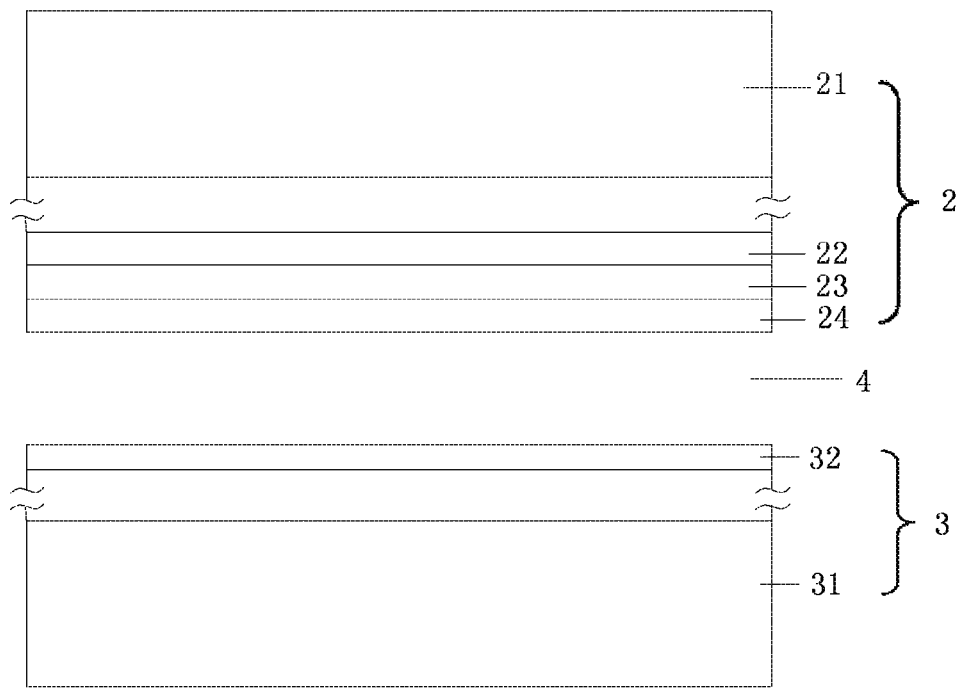
FIG. 5 is a structural diagram of a touch display panel according to the present invention.

Referring to FIG. 5, the IPS-LCD touch display panel includes: a color film (CF) substrate 2 and a thin film transistor (TFT) substrate 3 disposed opposite to each other, and a liquid crystal layer 4 disposed between the CF substrate and the TFT substrate.

Figure 6:
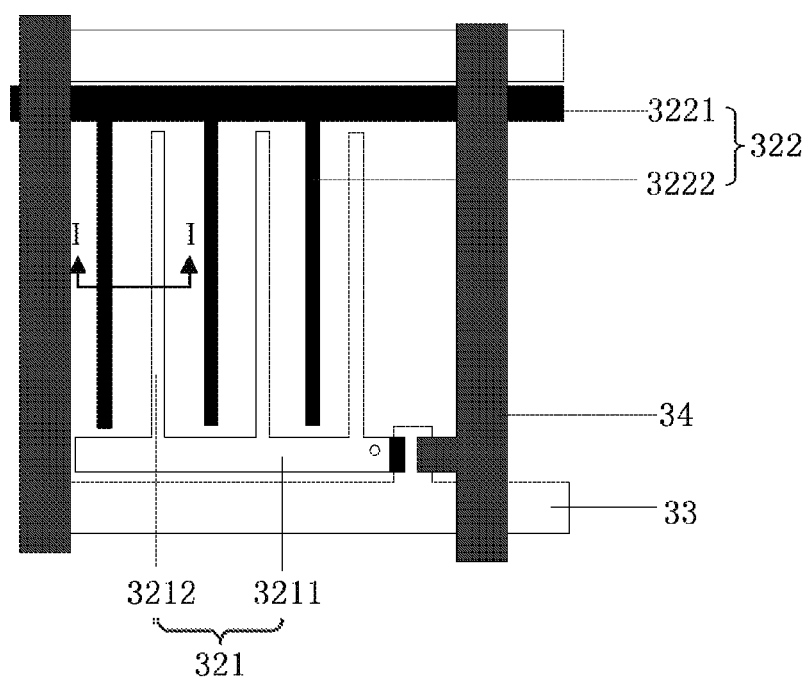
FIG. 6 is a plan view of a pixel unit of the first kind of TFT substrate of an IPS-LCD touch display panel.
Figure 7:
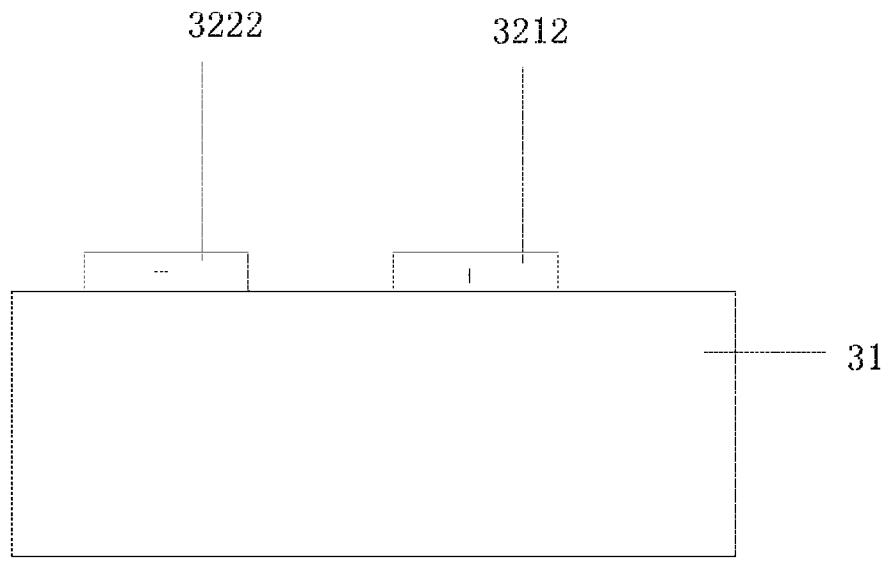
FIG. 7 is a sectional view taken along line I-I in FIG. 6.

The TFT substrate 3 is firstly described. Referring to FIG. 6 which is a plan view of a pixel unit and FIG. 7 which is a sectional view taken along line I-I in FIG. 6, the TFT substrate 3 includes a glass substrate 31 and a circuit board formed on the glass substrate 31. The surface of the circuit board close to the liquid crystal layer 4 is an electrode layer 32 including a common electrode 322 and a pixel electrode 321 which are used for providing a voltage to rotate the liquid crystal.

The circuit board includes a data line 34 and a gate line 33 intersecting with each other, a TFT transistor formed at the intersection of the data line 34 and the gate line 33, and a pixel electrode 321 formed in a region defined by the data line 34 and the gate line 33. Furthermore, the circuit board further includes: a common electrode line (not shown) disposed in the same layer as with the gate line 33 and substantially in parallel with the gate line 33; and a common electrode 322 electrically connected to the common electrode line. The gate electrode of the TFT transistor is a portion of the gate line 33, the source electrode of the TFT transistor is a portion of the data line 34, and the drain electrode of the TFT transistor is connected to the pixel electrode 321 via a via hole (not shown). The pixel electrode 321 includes a bar portion 3211 and a comb-shaped portion 3212 connected perpendicularly to the bar portion 3211. A portion of the common electrode 322 is also formed in the same layer as with the pixel electrode 321. The common electrode 322 has a bar portion 3221 being substantially parallel with the common electrode line and a comb-shaped portion 3222 substantially in perpendicular to the common electrode line. The comb-shaped portion 3222 and the comb-shaped portion 3212 of the pixel electrode 321 are disposed in an alternate arrangement, for a voltage to rotate the liquid crystal molecules.

In the above-mentioned structure, the bar portion 3221 and the comb-shaped portion 3222 form the comb-shaped structure of the common electrode 322, and the bar portion 3211 and the comb-shaped portion 3212 form the comb-shaped structure of the pixel electrode 321. The purpose of disposing the comb-shaped portions for the common electrode 322 and the pixel Therefore, for other embodiments, it is not limited to the comb-shaped structure, as long as the discontinuous gaps can be formed respectively in the common electrode 322 and the pixel electrode 321.

Figure 8:
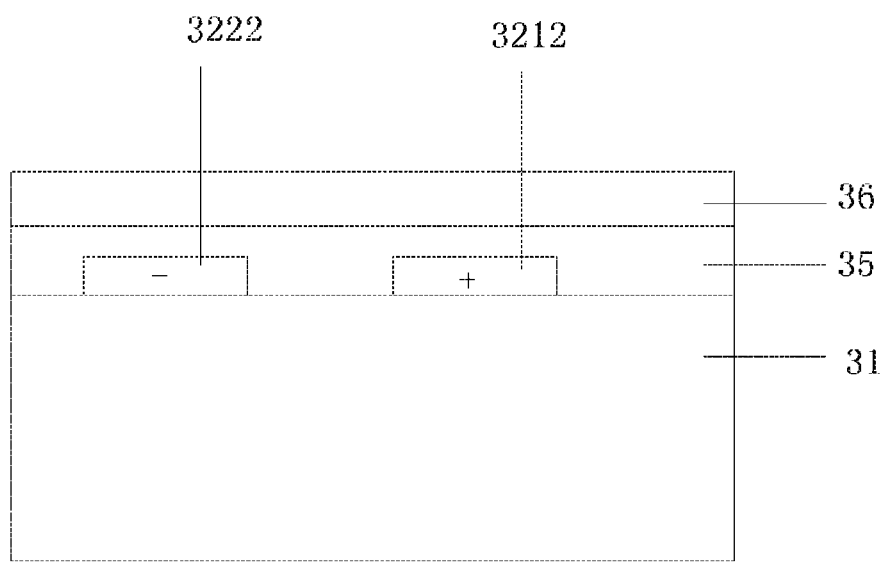
FIG. 8 is a structural sectional view of an optimized structure of the structure in FIG. 7.

Furthermore, the comb-shaped structure of the common electrode 322 and the comb-shaped structure of the pixel electrode 321 are formed on the surface of the TFT substrate 3 close to the liquid crystal layer 4. In order to improve the service life of both the comb-shaped structure of the common electrode 322 and the comb-shaped structure of the pixel electrode 321, as shown in FIG. 8, a protective film 35 may be disposed on the comb-shaped portion 3222 of the common electrode 322 and the comb-shaped portion 3212 of the pixel electrode 321, and the material of the protective film 35 may be silicon nitride. More preferably, a liquid crystal alignment layer 36 may further be disposed on the protective film 35, and the material of the liquid crystal alignment layer 36 may be polyimide.

It should be noted that the glass substrate 31 may also be made of a transparent material such as quartz or flexible plastic as required.

The CF substrate 2 is described as follows. Referring to FIG. 5, the CF substrate 2 includes a glass substrate 21, a light filter layer (not shown) disposed on the surface of the glass substrate 21, a light-blocking layer (not shown) and a touch layer close to the liquid crystal layer 4. The touch layer includes a first touch layer and a second touch layer. A driving line 22 is formed in the first touch layer, and a detecting line 24 is formed in the second touch layer. A dielectric layer 23 is disposed between the two touch layers.

Preferably, in the two touch layers, the driving line 22 and the detecting line 24 are disposed perpendicularly to each other, so that a touch control signal is detected when a touching body makes a touch at the intersection of the driving line 22 and the detecting line 24.

In the first embodiment, the second touch layer disposed with the detecting line 24 is closer to the liquid crystal layer 4. However, in other embodiments, the first touch layer disposed with the driving line 22 may be closer to the liquid crystal layer 4.

It should be noted that one unit formed by one driving line 22 and one detecting line 24 may correspond to one pixel unit of the TFT substrate 3 or correspond to multiple pixel units.

Figure 9:
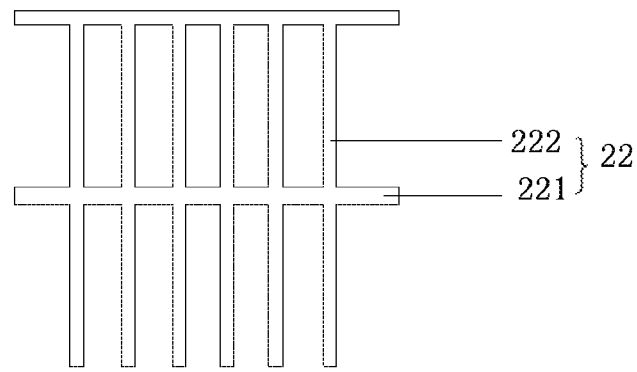
FIG. 9 is a structural diagram of a driving line according to the present invention.
Figure 10:
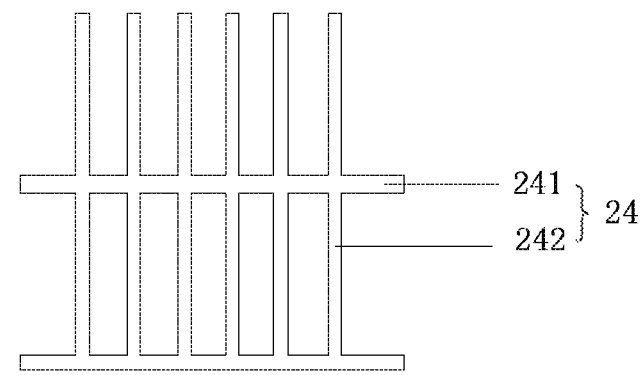
FIG. 10 is a structural diagram of a detecting line according to the present invention.

In the prior art, each of the driving line 22 and the detecting line 24 is an integral conductive layer. Unlike the prior art, in the first embodiment, the driving line 22 or the detecting line 24 is also disposed in a comb-shaped structure. Specifically, referring to FIG. 9, the comb-shaped structure of the driving line 22 includes a bar portion 221 and a comb-shaped portion 222 connected in perpendicular to the bar portion 221. Referring to FIG. 10, the comb-shaped structure of the detecting line 24 includes a bar portion 241 and a comb-shaped portion 242 connected in perpendicular to the bar portion 241.

Furthermore, as for the case where the comb-shaped portion 3222 of the common electrode 322 and the comb-shaped portion 3212 of the pixel electrode 321 are on a same layer and disposed alternately, and the detecting line 24 is closer to the liquid crystal layer 4, the detecting line 24 is specifically disposed as follows. 1) The comb-shaped portion 242 of the detecting line 24 is misaligned with respect to the comb-shaped portion 3212 of the pixel electrode 321; or 2) the comb-shaped portion 242 of the detecting line 24 is misaligned with respect to the comb-shaped portion 3222 of the common electrode 322; or 3) the comb-shaped portion 242 of the detecting line 24 is misaligned with respect to both the comb-shaped portion 3212 of the pixel electrode 321 and the comb-shaped portion 3222 of the common electrode 322. Thus it is avoided that the common electrode 322 and the pixel electrode 321 of the TFT substrate 3 are completely overlapped with the detecting line 24 of the CF substrate 2, thereby reducing the parasitic capacitance.

Figure 11:
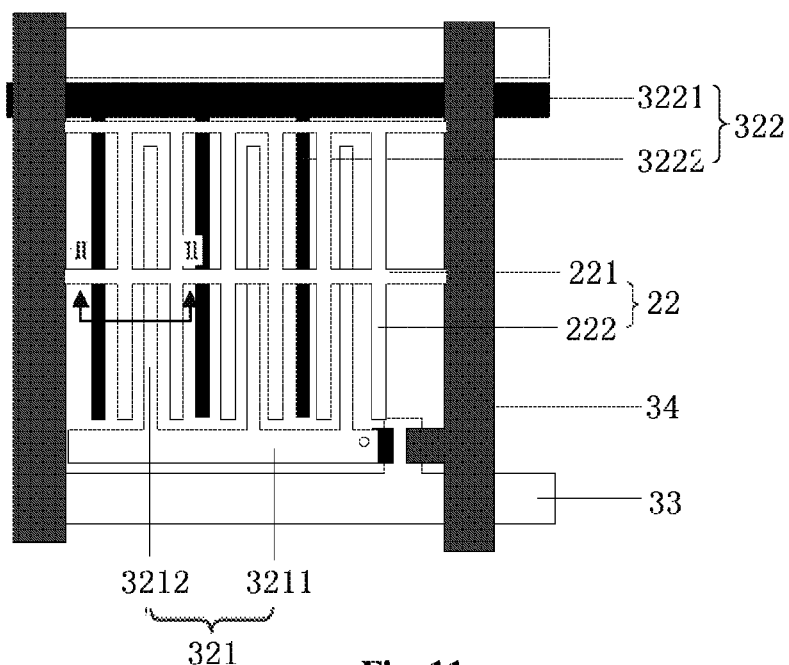
FIG. 11 is a plan view of a touch panel formed by a CF substrate and the pixel unit of the TFT substrate in FIG. 6.
Figure 12:
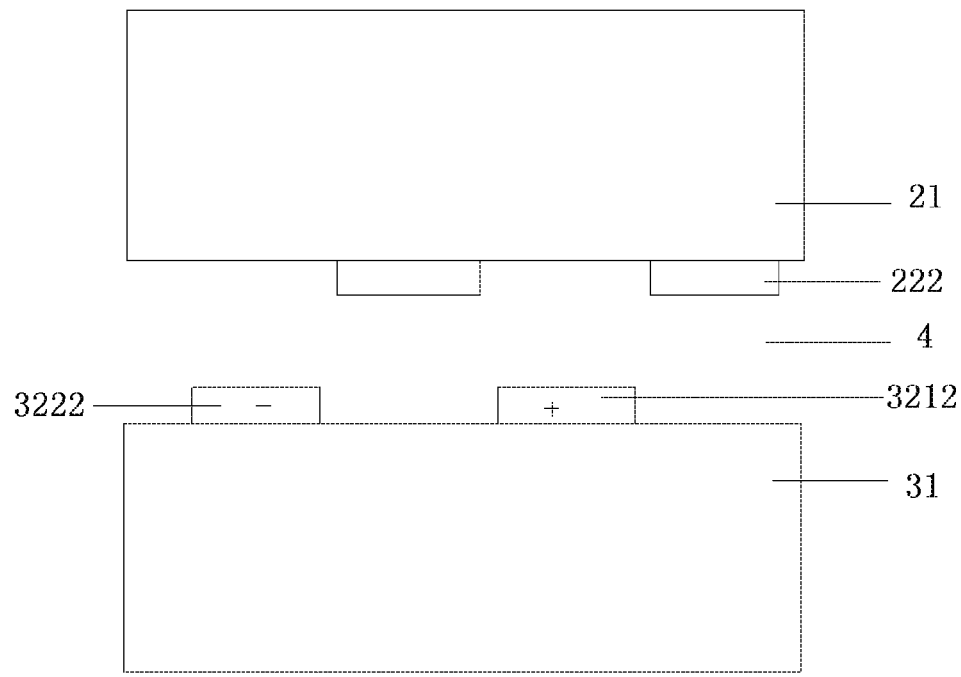
FIG. 12 is a sectional view taken along line II-II in FIG. 11.

As for the case where the comb-shaped portion 3222 of the common electrode 322 and the comb-shaped portion 3212 of the pixel electrode 321 are on a same layer and disposed alternately, and the driving line 22 is closer to the liquid crystal layer 4, the driving line 22 is specifically disposed as follows. 1) The comb-shaped portion 222 of the driving line 22 is misaligned with respect to the comb-shaped portion 321 of the pixel electrode 321; or 2) the comb-shaped portion 222 of the driving line 22 is misaligned with respect to the comb-shaped portion 3222 of the common electrode 322; or 3) the comb-shaped portion 222 of the driving line 22 is misaligned with respect to both the comb-shaped portion 3212 of the pixel electrode 321 and the comb-shaped portion 3222 of the common electrode 322. Thus it is avoided that the common electrode 322 and the pixel electrode 321 of the TFT substrate 3 are completely overlapped with the driving line 22 of the CF substrate 2, thereby reducing the parasitic capacitance. For the case of 3), in order to show clearly the technical solution of the first embodiment of the invention, FIG. 11 shows a plan view of a display panel corresponding to one pixel unit when the CF substrate 2 and the TFT substrate 3 are in position and FIG. 12 shows a sectional view taken along line II-II in FIG. 11. As can be seen in FIG. 11 and FIG. 12, the driving line 22 of the CF substrate 2 is misaligned respectively with respect to the comb-shaped portion 3212 of the pixel electrode and the comb-shaped portion 3222 of the common electrode of the TFT substrate 3 which are respectively disposed in two layers.

In short, the comb-shaped structure of the driving line 22 or the detecting line 24 is at least partially misaligned with respect to the comb-shaped structure of the common electrode 322 and/or the comb-shaped structure of the pixel electrode 321 in the TFT substrate 3 close to the liquid crystal layer 4. Thus it is avoided that the common electrode 322 and the pixel electrode 321 of the TFT substrate 3 are completely overlapped with the driving line 22 and/or the detecting line 24 of the CF substrate 2, thereby reducing the parasitic capacitance.

Figure 13:
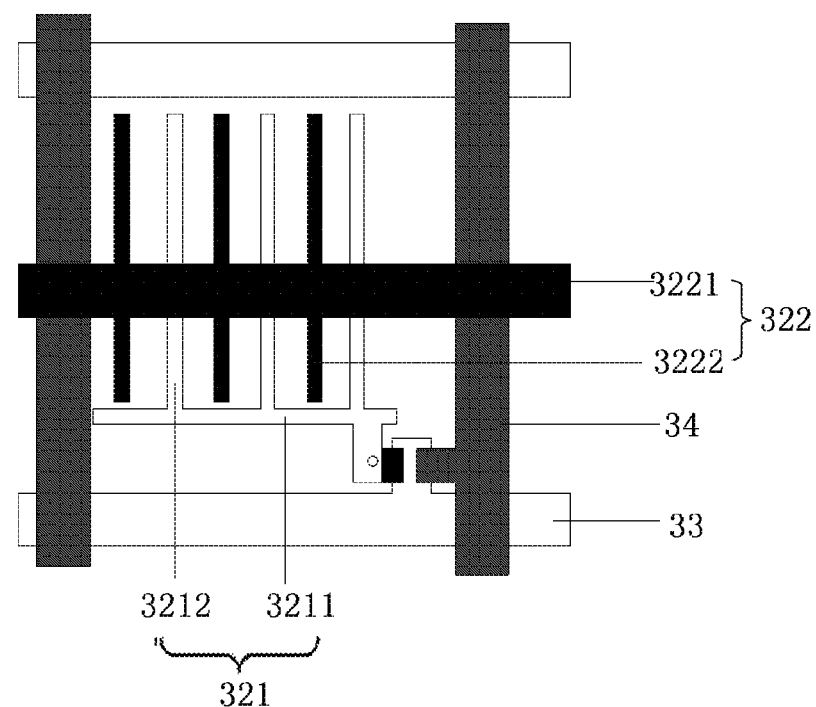
FIG. 13 is a plan view of a pixel unit of the second kind of TFT substrate of the IPS-LCD touch display panel.

As shown in FIG. 6, the bar portion 3221 of the common electrode 322 is disposed at one end of the comb-shaped portion 3222. It is understood that the bar portion 3221 is not limited to be disposed at one end of the comb-shaped portion 3222 and may also be disposed in the middle of the comb-shaped portion 3222 as shown in FIG. 13, in order to form discontinuous gaps.

Furthermore, there are multiple comb-shaped portions 3222 connected to the bar portion 3221 of one common electrode 322 and there are multiple comb-shaped portions 3212 connected to the bar portion 3211 of one pixel electrode 321. However, it should be noted that, for the common electrode 322, the multiple connected comb-shaped portions 3222 are not limited to be connected to one bar portion 3221 and may also be connected to multiple bars portions 3221. Similarly, for the pixel electrode 321, the multiple connected comb-shaped portions 3212 are not limited to be connected to one bar portion 3211 and may also be connected to multiple bar portions 3211. Correspondingly, for the driving line 22, multiple connected comb-shaped portions 222 are not limited to be connected to one bar portion 221 and may also be connected to multiple bar portions 221. Similarly, for the detecting line 24, the multiple connected comb-shaped portions 242 are not limited to be connected to one bar portion 241 and may also be connected to multiple bar portions 241.

Similarly, the bar portion 221 and the comb-shaped portion 222 form the comb-shaped structure of the driving line 22. The bar portion 241 and the comb-shaped portion 242 form the comb-shaped structure of the detecting line 24. The respective comb-shaped structures are disposed in order to dispose the discontinuous gaps (slits) for the respective integral structures, so as to dispose opening portions for making the electrical field pass through. Therefore, other embodiments are not limited to the comb-shaped structure, as long as the discontinuous gaps can be formed respectively for the driving line 22 and the detecting line 24.

In summary, for the IPS-LCD touch display panel according to the first embodiment, on the TFT substrate 3 close to the liquid crystal layer 4, the common electrode 322 and the pixel electrode 321 are on a same layer and disposed alternately. Sine the common electrode 322 and the pixel electrode 321 are disposed alternately, each of the common electrode 322 and the pixel electrode 321 has a comb-shaped structure. As for the above-mentioned, the common electrode 322 and the pixel electrode 321 are disposed in the same layer, and the touch layer is disposed on the CF substrate 2, the driving line and the detecting line are disposed all over the entire layer in the prior art. However, according to the present invention, it is different that the driving line 22 or the detecting line 24 is disposed in a comb-shaped structure as well, and the comb-shaped structure is at least partially misaligned with respect to at least one of the comb-shaped structure of the common electrode 322 and the comb-shaped structure of the pixel electrode 321 in the same layer. Thus it is avoided that the common electrode 322 and/or the pixel electrode 321 of the TFT substrate 3 are completely overlapped with the driving line 22 or the detecting line 24 of the CF substrate 2, thereby reducing the parasitic capacitance.

The above-mentioned misaligning includes partially misaligning and completely misaligning. In order to increase the quantity of electrodes disposed in a plane and to improve utilization rate, the comb-shaped structure of the driving line 22 or the detecting line 24 is at least partially complementary to the comb-shaped structure of the common electrode 322 and/or the comb-shaped structure of the pixel electrode 321 in the same layer.

In the first embodiment, in order to improve the light transmittance, the materials of the driving line 22 and the detecting line 24 are transparent, such as indium tin oxide, indium zinc oxide or the combination thereof. The materials of the common electrode 322, the gate line 33 and the data line 34 may be metal such as copper and aluminum. The materials of the common electrode 322, the gate line 33 and the data line 34 may also be a transparent conductive material, so as to increase the light transmittance. The material of the pixel electrode 312 is generally a transparent conductive material. The transparent conductive material may also be, for example, indium tin oxide, indium zinc oxide or the combination thereof.

Besides the driving line 22 or the detecting line 24 disposed on the surface of the CF substrate 2, a liquid crystal alignment layer made of polyimide may also be disposed on the driving line 22 or the detecting line 24.

Second Embodiment

Figure 14:
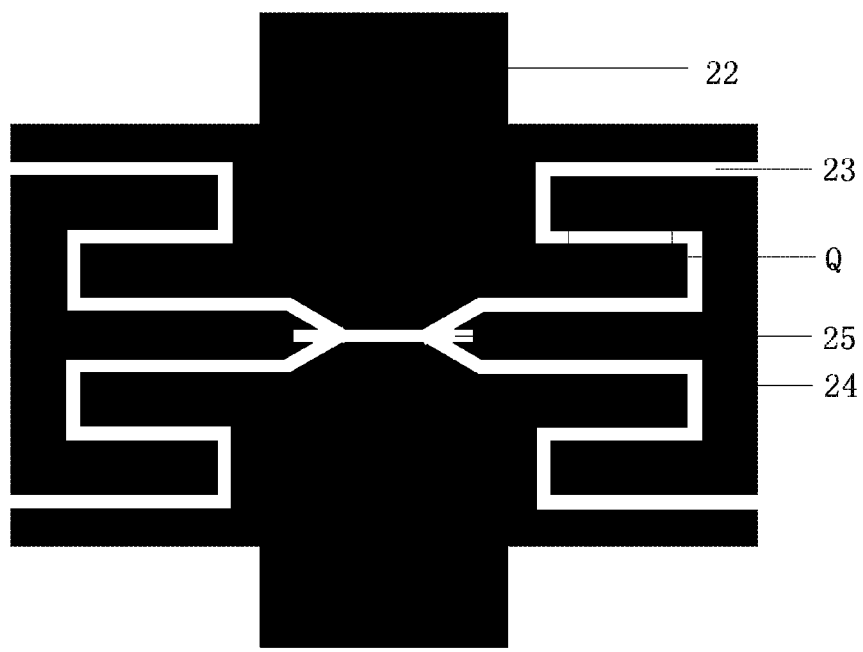
FIG. 14 is a structural diagram of a touch layer according to the present invention.

The structure of the touch display panel according to the second embodiment is substantially the same as the structure of the touch display panel according to the first embodiment, except that, for the CF substrate 2, the driving line 22 and detecting line 24 are disposed in one touch layer, rather than that the driving line 22 and the detecting line 24 are respectively disposed in two touch layers, as shown in FIG. 14. The driving line 22 and the detecting line 24 are isolated from each other via a dielectric layer 23. Furthermore, in the second embodiment, the driving line 22 separates the detecting line 24 into separate (individual) portions. On the separate portions, a first connecting portion (first bridging member) 25 is disposed to connect the separate portions of detecting line 24 across the driving line 22. In other embodiment, the detecting line 24 may also separate the driving line 22 into separate portions. A second connecting portion (second bridging member) is disposed on the separate portions, the second connecting portion crosses (bridges) the detecting line 24 to connect the separate portions of driving line 22.

Figure 15:
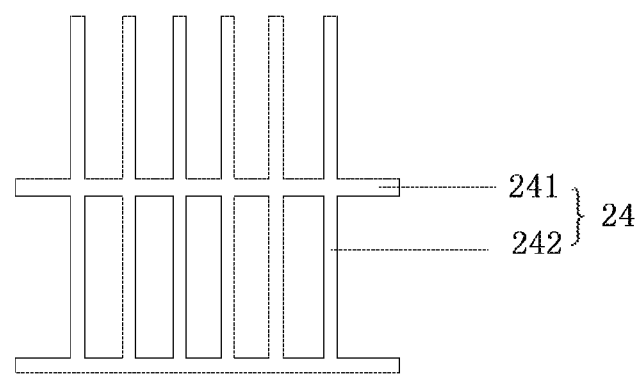
FIG. 15 is an enlarged view of the region Q in FIG. 14.
Figure 15:
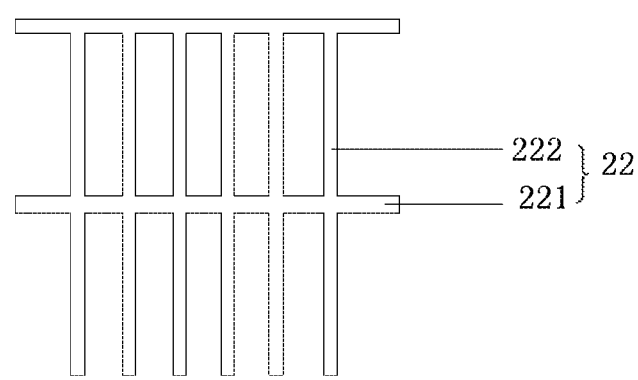

FIG. 15 shows an enlarged view of the region Q in FIG. 14. The comb-shaped structure of the driving line 22 includes a bar portion 221 and a comb-shaped portion 222 connected in perpendicular to the bar portion 221. The comb-shaped structure of the detecting line 24 includes a bar portion 241 and a comb-shaped portion 242 connected in perpendicular to the bar portion 241.

Furthermore, as for the case where the comb-shaped portion 3222 of the common electrode 322 and the comb-shaped portion 3212 of the pixel electrode 321 are on a same layer and disposed alternately, and the driving line 22 and the detecting line 24 are disposed in one touch layer, the touch layer is specifically disposed as follows: 1) one of the comb-shaped portion 222 of the driving line 22 and the comb-shaped portion 242 of the detecting line 24 is misaligned with respect to the comb-shaped portion 3212 of the pixel electrode 321, or, both of the comb-shaped portion 222 of the driving line 22 and the comb-shaped portion 242 of the detecting line 24 are misaligned with respect to the comb-shaped portion 3212 of the pixel electrode 321; or 2) one of the comb-shaped portion 222 of the driving line 22 and the comb-shaped portion 242 of the detecting line 24 is misaligned with respect to the comb-shaped portion 3222 of the common electrode 322, or, both of the comb-shaped portion 222 of the driving line 22 and the comb-shaped portion 242 of the detecting line 24 are misaligned with respect to the comb-shaped portion 3222 of the common electrode 322; or 3) one of the comb-shaped portion 222 of the driving line 22 and the comb-shaped portion 242 of the detecting line 24 is misaligned with respect to both the comb-shaped portion 3212 of the pixel electrode 321 and the comb-shaped portion 3222 of the common electrode 322, or, both of the comb-shaped portion 222 of the driving line 22 and the comb-shaped portion 242 of the detecting line 24 are misaligned with respect to both the comb-shaped portion 3212 of the pixel electrode 321 and the comb-shaped portion 3222 of the common electrode 322. Thus it is avoided that the common electrode 322 and/or the pixel electrode 321 of the TFT substrate 3 are/is completely overlapped with the detecting line 24 and/or the driving line 22 of the CF substrate 2, thereby reducing the parasitic capacitance.

In short, the comb-shaped structure of the driving line 22 and/or the detecting line 24 is at least partially misaligned with respect to at least one of the comb-shaped structure of the common electrode 322 and the comb-shaped structure of the pixel electrode 321 in the TFT substrate 3 close to the liquid crystal layer 4.

The above-mentioned misaligning includes partially misaligning and completely misaligning. In order to increase the number of electrodes disposed in a plane and to improve utilization rate, the comb-shaped structure of the driving line 22 and/or the detecting line 24 is at least partially complementary to the comb-shaped structure of the common electrode 322 and/or the comb-shaped structure of the pixel electrode 321 in the TFT substrate 3 close to the liquid crystal layer 4.

Third Embodiment

Figure 16:
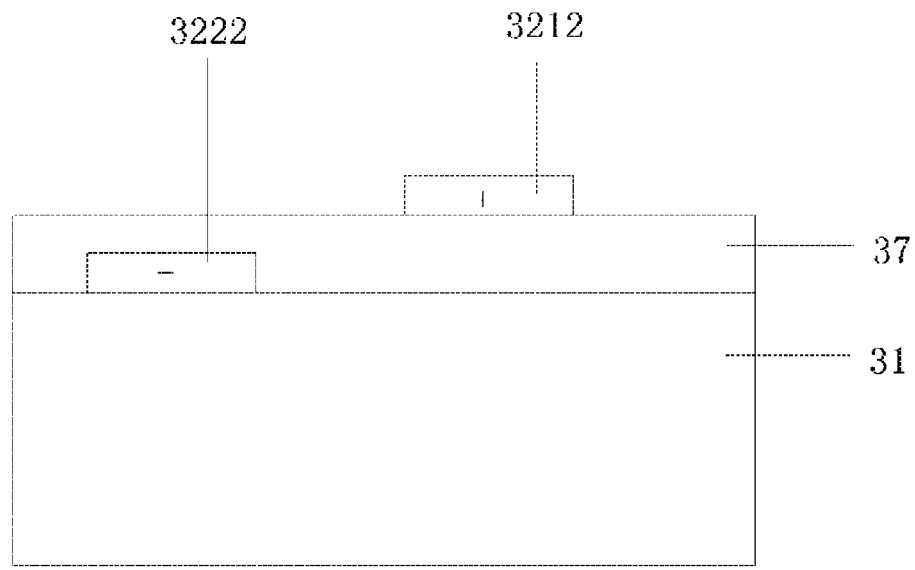
FIG. 16 is a sectional view of the third kind of TFT substrate of the IPS-LCD touch display panel.

The structure of the touch display panel according to the third embodiment is substantially the same as the structure of the touch display panel according to the first embodiment, the difference is that for the TFT substrate 3, the common electrode 322 and the gate line 33 are firstly formed on the glass substrate 31 and then the TFT structure and the pixel electrode 321 are formed. Therefore, the comb-shaped portion 3222 of the common electrode 322 and the comb-shaped portion 3212 of the pixel electrode 321 may not be formed in the same layer, as shown in FIG. 16, one or more insulating layer such as a passivation layer 37 is disposed between the comb-shaped portion 3222 of the common electrode 322 and the comb-shaped portion 3212 of the pixel electrode 321.

As for the case where the comb-shaped portion 3212 of the pixel electrode 321 is closer to the liquid crystal layer 4 than the comb-shaped portion 3222 of the common electrode 322 and the detecting line 24 is closer to the liquid crystal layer 4, the touch layer is specifically disposed as follows. The comb-shaped portion 242 of the detecting line 24 is misaligned with respect to the comb-shaped portion 3212 of the pixel electrode 321. Thus it is avoided that the pixel electrode 321 of the TFT substrate 3 is completely overlapped with the detecting line 24 of the CF substrate 2, thereby reducing the parasitic capacitance.

As for the case where the comb-shaped portion 3212 of the pixel electrode 321 is closer to the liquid crystal layer 4 than the comb-shaped portion 3222 of the common electrode 322 and the driving line 22 is closer to the liquid crystal layer 4, the touch layer is specifically disposed as follows. The comb-shaped portion 222 of the driving line 22 is misaligned with respect to the comb-shaped portion 3212 of the pixel electrode 321. Thus, it is avoided that the pixel electrode 321 of the TFT substrate 3 is completely overlapped with the driving line 22 of the CF substrate 2, thereby reducing the parasitic capacitance.

As for the case where the comb-shaped portion 3212 of the pixel electrode 321 is closer to the liquid crystal layer 4 than the comb-shaped portion 3222 of the common electrode 322, and the driving line 22 and the detecting line 24 are disposed in the same touch layer, the touch layer is specifically disposed as follows. Both of the comb-shaped portion 222 of the driving line 22 and the comb-shaped portion 242 of the detecting line 24 are misaligned with respect to the comb-shaped portion 3212 of the pixel electrode 321; or one of the comb-shaped portion 222 of the driving line 22 and the comb-shaped portion 242 of the detecting line 24 is misaligned with respect to the comb-shaped portion 3212 of the pixel electrode 321. Thus, it is avoided that the pixel electrode 321 of the TFT substrate 3 is completely overlapped with the detecting line 24 and/or the driving line 22 of the CF substrate 2, thereby reducing the parasitic capacitance.

In short, the comb-shaped structure of the driving line 22 and/or the detecting line 24 is at least partially misaligned with respect to the comb-shaped structure of the pixel electrode 321 in the TFT substrate 3 close to the liquid crystal layer 4. Thus it is avoided that the pixel electrode 321 of the TFT substrate 3 is completely overlapped with the driving line 22 and/or the detecting line 24 of the CF substrate 2, thereby reducing the parasitic capacitance.

As for the case where the comb-shaped portion 3222 of the common electrode 322 is closer to the liquid crystal layer 4 than the comb-shaped portion 3212 of the pixel electrode 321 and the detecting line 24 is closer to the liquid crystal layer 4, the touch layer is specifically disposed as follows: The comb-shaped portion 242 of the detecting line 24 is misaligned with respect to the comb-shaped portion 3222 of the common electrode 322. Thus, it is avoided that the common electrode 322 of the TFT substrate 3 is completely overlapped with the detecting line 24 of the CF substrate 2, thereby reducing the parasitic capacitance.

As for the case where the comb-shaped portion 3222 of the common electrode 322 is closer to the liquid crystal layer 4 than the comb-shaped portion 3212 of the pixel electrode 321 and the driving line 22 is closer to the liquid crystal layer 4, the touch layer is specifically disposed as follows: The comb-shaped portion 222 of the driving line 22 is misaligned with respect to the comb-shaped portion 3222 of the common electrode 322. Thus, it is avoided that the common electrode 322 of the TFT substrate 3 is completely overlapped with the driving line 22 of the CF substrate 2, thereby reducing the parasitic capacitance.

As for the case where the comb-shaped portion 3222 of the common electrode 322 is closer to the liquid crystal layer 4 than the comb-shaped portion 3212 of the pixel electrode 321 and the driving line 22 and the detecting line 24 are disposed in the same touch layer, the touch layer is specifically disposed as follows. Both of the comb-shaped portion 222 of the driving line 22 and the comb-shaped portion 242 of the detecting line 24 are misaligned with respect to the comb-shaped portion 3222 of the common electrode 322; or one of the comb-shaped portion 222 of the driving line 22 and the comb-shaped portion 242 of the detecting line 24 is misaligned with respect to the comb-shaped portion 3222 of the common electrode 322. Thus, it is avoided that the common electrode 322 of the TFT substrate 3 is completely overlapped with the detecting line 24 and/or the driving line 22 of the CF substrate 2, thereby reducing the parasitic capacitance.

In short, the comb-shaped structure of the driving line 22 and/or the comb-shaped structure of the detecting line 24 are/is at least partially misaligned with respect to the comb-shaped structure of the common electrode 322 on the TFT substrate 3 close to the liquid crystal layer 4. Thus it is avoided that the common electrode 322 of the TFT substrate 3 is completely overlapped with the driving line 22 and/or the detecting line 24 of the CF substrate 2, thereby reducing the parasitic capacitance.

In summary, the comb-shaped structure of the driving line 22 and/or the detecting line 24 are/is at least partially misaligned with respect to the comb-shaped structure of the common electrode 322 or the comb-shaped structure of the pixel electrode 312 on the TFT substrate 3 close to the liquid crystal layer 4. Thus, it is avoided that the common electrode 322 or the pixel electrode 312 of the TFT substrate 3 is completely overlapped with the driving line 22 and/or the detecting line 24 of the CF substrate 2, thereby reducing the parasitic capacitance.

The above-mentioned misaligning includes partially misaligning and completely misaligning. In order to increase the quantity of electrodes disposed in a plane and to improve utilization rate, the comb-shaped structure of the driving line 22 and/or the detecting line 24 is at least partially complementary to the comb-shaped structure of the common electrode 322 or the comb-shaped structure of the pixel electrode 321 on the TFT substrate 3 close to the liquid crystal layer 4.

Fourth Embodiment

According to the description of the IPS mode and the FFS mode for implementing the liquid crystal display in the background. Compared with the IPS mode, the FFS mode has higher light transmittance. This is because, in the FFS mode, the common electrode and the pixel electrode do not have to be disposed alternately, leading to a reduced space therebetween. Therefore, the upper portion of the common electrode or the pixel electrode in the upper electrode layer can also generate a lateral electric field, and the liquid crystal molecules on the corresponding electrode can also be rotated. It is no longer limited to the case in the IPS mode where the lateral electric field only exist between the common electrode and the pixel electrode, each electrode almost has no electric field, and the liquid crystal molecules on each electrode cannot be rotated.

In the fourth embodiment, the FFS-LCD touch display panel which operates in the FFS liquid display mode is taken as an example to explain the technical solution of the present invention.

Referring to FIG. 5, the FFS-LCD touch display panel includes: a color film (CF) substrate 2 and a thin film transistor (TFT) substrate 3 disposed opposite to each other, and a liquid crystal layer 4 disposed between the CF substrate and the TFT substrate. The main difference between the FFS-LCD touch display panel and the IPS-LCD touch display panel lies in the TFT substrate 3.

Figure 17:
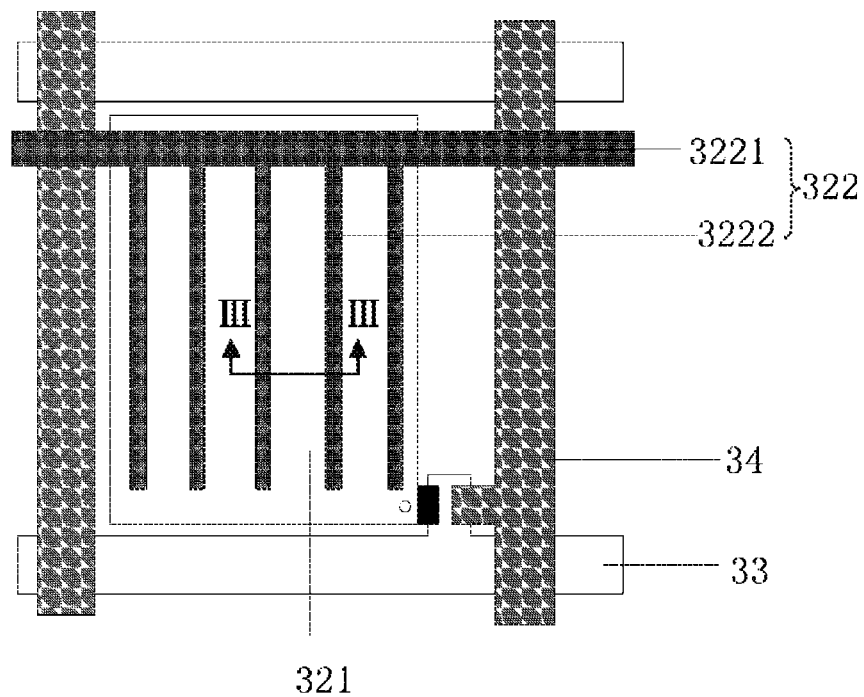
FIG. 17 is a plan view of a pixel unit of a TFT substrate of an FFS-LCD touch display panel.
Figure 18:
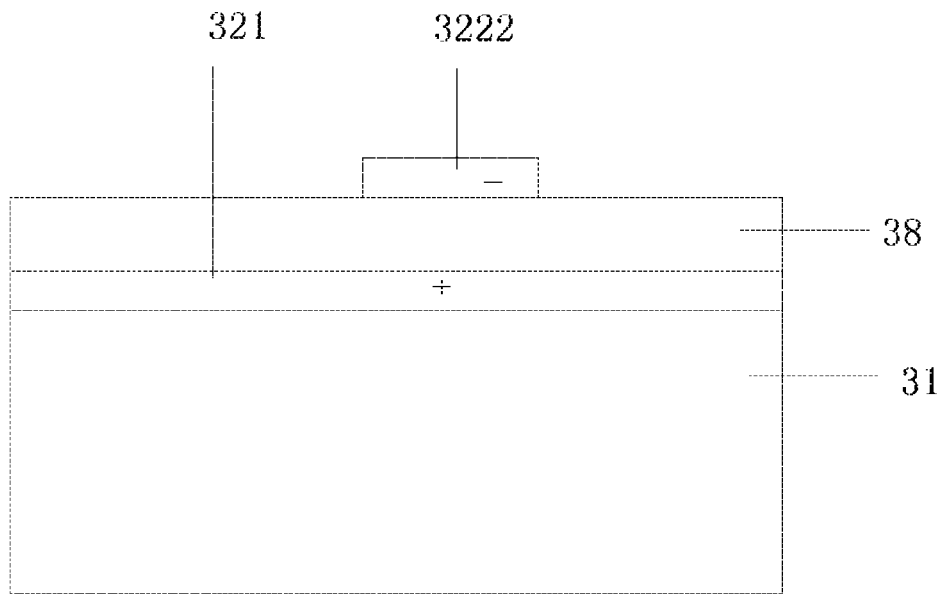
FIG. 18 is a sectional view taken along line III-III in FIG. 17.

The TFT substrate 3 of the FFS-LCD touch display panel is described as follows. Referring to FIG. 17 which is a plan view of a pixel unit and FIG. 18 which a sectional view taken along line III-III in FIG. 17, the TFT substrate 3 includes a glass substrate 31 and a circuit board formed on the glass substrate 31. The circuit board includes a data line 34 and a gate line 33 intersecting with each other, a TFT transistor formed at the intersection of the data line 34 and the gate line 33, and a common electrode (line) 322 and a pixel electrode 321, the common electrode (line) 322 is substantially parallel with the gate line 33. The gate electrode of the TFT transistor is a portion of the gate line 33, the source electrode of the TFT transistor is a portion of the data line 34, and the drain electrode of the TFT transistor is connected to the pixel electrode 321 via a via hole (not shown). The pixel electrode 321 is an integral conductive layer. On the pixel electrode 321, an insulating layer 38 and the common electrode 322 are formed from bottom to top. The common electrode 322 has a bar portion 3221 substantially disposed in parallel with the common electrode line and a comb-shaped portion 3222 disposed substantially in perpendicular to the common electrode line. The comb-shaped portion 3222 and the pixel electrode 321 are used for providing a voltage to rotate the liquid crystal molecules.

In the above-mentioned structure, the bar portion 3221 and the comb-shaped portion 3222 form the comb-shaped structure of the common electrode 322, in order to dispose discontinuous gaps (slits) for the integral structure, so as to dispose an opening portion for making the electrical field pass through. Therefore, other embodiments are not limited to the comb-shaped structure, as long as the discontinuous gaps can be formed for the common electrode 322.

Figure 19:
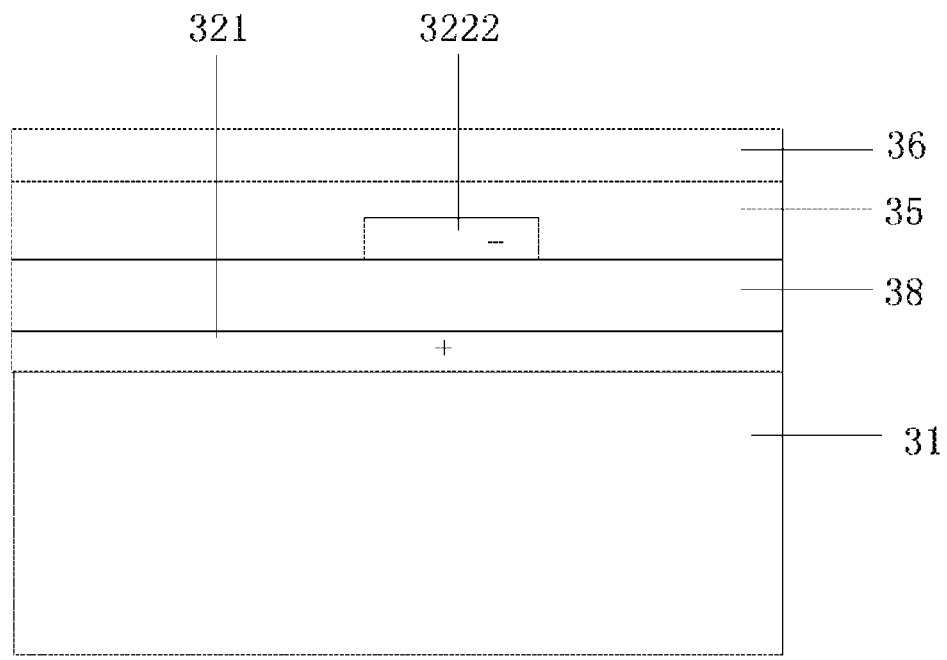
FIG. 19 is a structural sectional view of an optimized structure of the structure in FIG. 18.

Furthermore, the comb-shaped structure of the common electrode 322 is disposed on the surface of the TFT substrate 3, the surface is close to the liquid crystal layer 4. In order to improve the service life of the comb-shaped structure of the common electrode 322, as shown in FIG. 19, a protective film 35 may be disposed on the comb-shaped portion 3222 of the common electrode 322, and the material of the protective film 35 may be silicon nitride. More preferably, a liquid crystal alignment layer 36 may further be dispose on the protective film 35, and the material of the liquid crystal alignment layer 36 may be polyimide.

It should be noted that the glass substrate 31 may also be made of a transparent material such as quartz or flexible plastic as required.

The CF substrate 2 is described next. Similar to the first embodiment and the second embodiment, the touch layer may include a first touch layer and a second touch layer. The driving line 22 is formed in the first touch layer, and the detecting line 24 is formed in the second touch layer. A dielectric layer 23 is disposed between the two touch layers. The driving line 22 and the detecting line 24 may also be disposed in one touch layer.

In the following, the solution in which the driving line 22 and the detecting line 24 are respectively formed in two touch layers is firstly described.

Preferably, in the two touch layer, the driving line 22 and the detecting line 24 are disposed perpendicularly to each other, so that a touch control signal is detected when a touching body makes a touch at the intersection of the driving line 22 and the detecting line 24.

In the fourth embodiment, the driving line 22 and the detecting line 24 respectively formed in two touch layers may be disposed in the following two ways. 1) The second touch layer disposed with the detecting line 24 is closer to the liquid crystal layer 4 and 2) the first touch layer disposed with the driving line 22 may be closer to the liquid crystal layer 4.

It should be noted that one unit defined by one driving line 22 and one detecting line 24 may correspond to one pixel unit of the TFT substrate 3 or correspond to multiple pixel units.

In the prior art, each of the driving line 22 and the detecting line 24 is an integral conductive layer. Unlike the prior art, in the fourth embodiment, the driving line 22 or the detecting line 24 is also disposed in a comb-shaped structure. Specifically, referring again to FIG. 9, the comb-shaped structure of the driving line 22 includes a bar portion 221 and a comb-shaped portion 222 connected in perpendicular to the bar portion 221. Referring to FIG. 10, the comb-shaped structure of the detecting line 24 includes a bar portion 241 and a comb-shaped portion 242 connected in perpendicular to the bar portion 241.

Furthermore, as for the case where the common electrode 322 is disposed with the comb-shaped portion 3222, the pixel electrode 321 is in an integral structure and the detecting line 24 is closer to the liquid crystal layer 4, the touch layer is specifically disposed as follows. The comb-shaped portion 242 of the detecting line 24 is misaligned with respect to the comb-shaped portion 3222 of the common electrode 322. Thus, it is avoided that the common electrode 322 of the TFT substrate 3 is completely overlapped with the detecting line 22 of the CF substrate 2, thereby reducing the parasitic capacitance.

Figure 20:
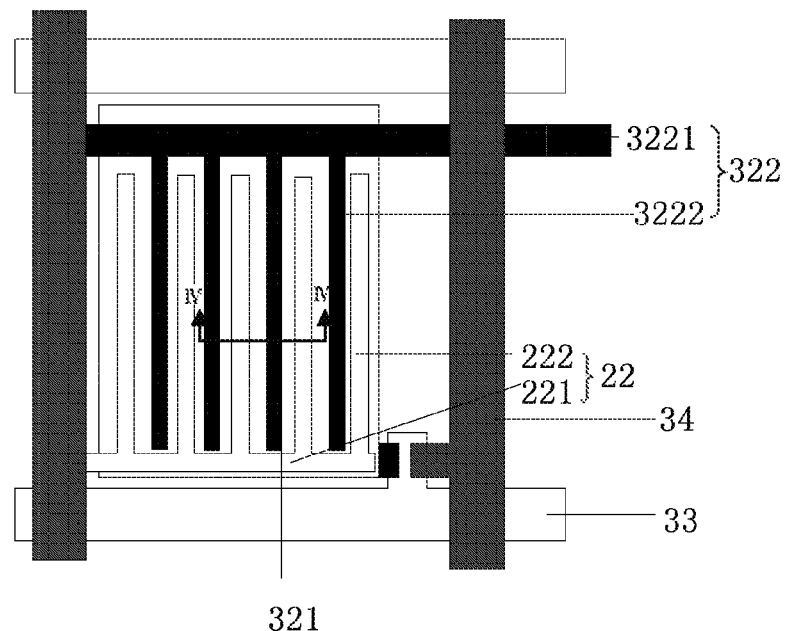
FIG. 20 is a plan view of a touch panel form by a CF substrate and the pixel unit of the TFT substrate in FIG. 17.
Figure 21:
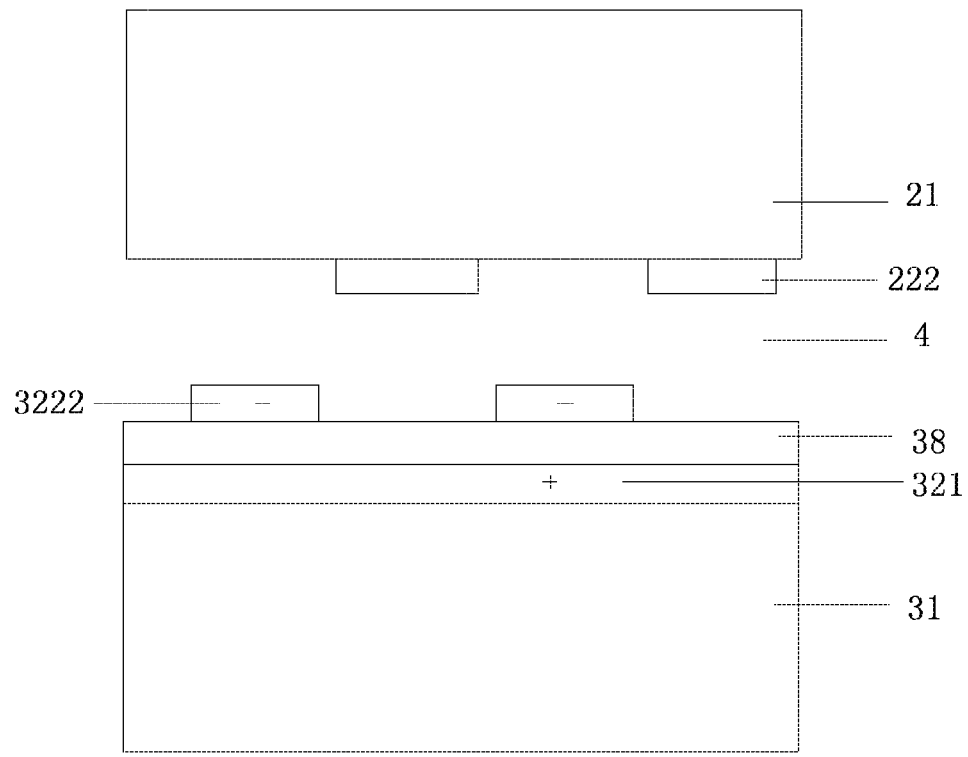
FIG. 21 is a sectional view taken along line IV-IV in FIG. 20.

As for the case where the common electrode 322 is disposed with the comb-shaped portion 3222, the pixel electrode 321 is in an integral structure and the driving line 22 is closer to the liquid crystal layer 4, the touch layer is specifically disposed as follows. The comb-shaped portion 222 of the driving line 22 is misaligned with respect to the comb-shaped portion 3222 of the common electrode 322. Thus it is avoided that the common electrode 322 of the TFT substrate 3 is completely overlapped with the driving line 22 of the CF substrate 2, thereby reducing the parasitic capacitance. For the above-mentioned case, in order to show the technical solution of the fourth embodiment of the invention clearly, FIG. 20 shows a plan view of a display panel corresponding to one pixel unit when the CF substrate 2 and the TFT substrate 3 are in position and FIG. 21 shows a sectional view taken along line IV-IV in FIG. 20. As can be seen in FIG. 20 and FIG. 21, the driving line 22 of the CF substrate 2 is misaligned respectively with respect to the comb-shaped portion 3212 of the pixel electrode and the comb-shaped portion 3222 of the common electrode of the TFT substrate 3, the pixel electrode and the common electrode are respectively disposed in two layers.

In short, the comb-shaped structure of the driving line 22 or the detecting line 24 is at least partially misaligned with respect to the comb-shaped structure of the common electrode 322 on the TFT substrate 3 close to the liquid crystal layer 4. Thus it is avoided that the common electrode 322 of the TFT substrate 3 is completely overlapped with the driving line 22 or the detecting line 24 of the CF substrate 2, thereby reducing the parasitic capacitance.

It is understood that there are multiple comb-shaped portions 3222 connected to the bar portion 3221 of one common electrode 322. However, it should be noted that, for the common electrode 322, the multiple connected comb-shaped portions 3222 are not limited to be connected to one bar portion 3221 and may also be connected to multiple bars portions 3221. Correspondingly, for the driving line 22, multiple connected comb-shaped portions 222 are not limited to be connected to one bar portion 221 and may also be connected to multiple bar portions 221. Similarly, for the detecting line 24, the multiple connected comb-shaped portions 242 are not limited to be connected to one bar portion 241 and may also be connected to multiple bar portions 241.

Similarly, the bar portion 221 and the comb-shaped portion 222 form the comb-shaped structure of the driving line 22. The bar portion 241 and the comb-shaped portion 242 form the comb-shaped structure of the detecting line 24. The respective comb-shaped structures are disposed in order to dispose the incontinuous gaps (slits) for the respective integral structures, so as to dispose opening portions for making the electrical field pass through. Therefore, for other embodiments, both the detecting line 24 and the driving line 22 are not limited to be disposed in the comb-shaped structure, as long as the discontinuous gaps can be formed respectively for the driving line 22 and the detecting line 24.

In the following, the solution in which the driving line 22 and the detecting line 24 are formed in one touch layer is described.

Referring again to FIG. 14, the driving line 22 and the detecting line 24 are separated by a dielectric layer 23. The driving line 22 and the detecting line 24 are separated from each other in the following two ways. 1) The driving line 22 separates the detecting line 24 into separate portions, a first connecting portion (first bridging member) 25 is disposed on the separate portions, the first connecting portion 25 crosses (bridges) the driving line 22 to connect the separate portions of detecting line 24; 2) the detecting line 24 may also separate the driving line 22 into separate portions, a second connecting portion is disposed on the separate portions, the second connecting portion 25 crosses the detecting line 24 to connect the separate portions of driving line 22.

In the prior art, each of the driving line 22 and the detecting line 24 is an integral conductive layer. Unlike the prior art, in the fourth embodiment, the driving line 22 or the detecting line 24 is also disposed in a comb-shaped structure. Specifically, referring to FIG. 9, the comb-shaped structure of the driving line 22 includes a bar portion 221 and a comb-shaped portion 222 connected in perpendicular to the bar portion 221. Referring to FIG. 10, the comb-shaped structure of the detecting line 24 includes a bar portion 241 and a comb-shaped portion 242 connected in perpendicular to the bar portion 241.

Furthermore, as for the case where the common electrode 322 is disposed with the comb-shaped portion 3222, the pixel electrode 321 is disposed in an integral structure and the driving line 22 and the detecting line 24 are disposed in one touch layer, the touch layer is specifically disposed as follows. One of the comb-shaped portion 222 of the driving line 22 and the comb-shaped portion 242 of the detecting line 24 is misaligned with respect to the comb-shaped portion 3222 of the common electrode 322; or both of the comb-shaped portion 222 of the driving line 22 and the comb-shaped portion 242 of the detecting line 24 are misaligned with respect to the comb-shaped portion 3222 of the common electrode 322. Thus it is avoided that the common electrode 322 of the TFT substrate 3 is completely overlapped with the detecting line 24 and/or the driving line 22 of the CF substrate 2, thereby reducing the parasitic capacitance.

In short, the comb-shaped structure of the driving line 22 or/and the detecting line 24 is at least partially misaligned with respect to the comb-shaped structure of the common electrode 322 on the TFT substrate 3 close to the liquid crystal layer 4. Thus it is avoided that the common electrode 322 of the TFT substrate 3 is completely overlapped with the driving line 22 and/or the detecting line 24 of the CF substrate 2, thereby reducing the parasitic capacitance.

The above-mentioned misaligning includes partially misaligning and completely misaligning. In order to increase the quantity of electrodes disposed in a plane and to improve utilization rate, the comb-shaped structure of the driving line 22 and/or the detecting line 24 is at least partially complementary to the comb-shaped structure of the common electrode 322 on the TFT substrate 3 close to the liquid crystal layer 4.

Besides the driving line 22 or the detecting line 24 disposed on the surface of the CF substrate 2, a liquid crystal alignment layer made of polyimide may also be disposed on the driving line 22 or the detecting line 24.

Fifth Embodiment

The structure of FFS-LCD touch display panel of the fifth embodiment is substantially the same as the structure of the touch display panel of the fourth embodiment, the difference is that for the TFT substrate 3, the common electrode 322 and the gate electrode are disposed in the same layer and are substantially parallel with each other, and the common electrode 322 is an integral conductive layer. On the common electrode 322, an insulating layer 38 and the pixel electrode 321 are formed from bottom to top. The pixel electrode 321 is connected to the drain electrode via a hole.

The pixel electrode 321 includes a bar portion 3211 and a comb-shaped portion 3212 connected in perpendicular to the bar portion 3211. The comb-shaped portion 3212 and the common electrode 322 are used for providing a voltage to rotate the liquid crystal molecules.

In the above-mentioned structure, in order to dispose discontinuous gaps (slits) for the integral structure(s), the bar portion 3211 and the comb-shaped portion 3212 form the comb-shaped structure of the pixel electrode 321, so as to dispose an opening portion for making the electrical field pass through. Therefore, for other embodiments, the pixel electrode 321 is not limited to the comb-shaped structure, as long as the discontinuous gaps can be formed for the pixel electrode 321.

Furthermore, the comb-shaped structure of the pixel electrode 321 is formed on the surface of the TFT substrate, the surface is close to the liquid crystal layer 4. In order to improve the service life of the comb-shaped structure of the pixel electrode 321, a protective film may be disposed over the comb-shaped portion 3212 of the pixel electrode 321, and the material of the protective film may be silicon nitride. More preferably, a liquid crystal alignment layer made of polyimide may further be disposed on the protective film.

The CF substrate 2 is described as follow. Similar to the fourth embodiment, the touch layer may be disposed in the following two ways. 1) The touch layer may include a first touch layer and a second touch layer; a driving line 22 is formed in the first touch layer; a detecting line 24 is formed in the second touch layer; and a dielectric layer 23 is disposed between the two touch layers. 2) The driving line 22 and the detecting line 24 are formed in one touch layer.

In the following, the solution in which the driving line 22 and the detecting line 24 are respectively formed in two touch layers is firstly described.

Preferably, in the two touch layers, the driving line 22 and the detecting line 24 are disposed perpendicularly to each other, so that a touch control signal may be detected when a touching body makes a touch at the intersection of the driving line 22 and the detecting line 24.

In the fifth embodiment, the driving line 22 and the detecting line 24 respectively formed in two touch layers may be disposed in the following two ways. 1) The second touch layer disposed with the detecting line 24 is closer to the liquid crystal layer 4 and 2) the first touch layer disposed with the driving line 22 may be closer to the liquid crystal layer 4.

It should be noted that one unit defined by one driving line 22 and one detecting line 24 may correspond to one pixel unit of the TFT substrate 3 or correspond to multiple pixel units.

In the prior art, each of the driving line 22 and the detecting line 24 is an integral conductive layer. Unlike the prior art, in the fifth embodiment, the driving line 22 or the detecting line 24 is also disposed in a comb-shaped structure. Specifically, referring to FIG. 9, the comb-shaped structure of the driving line 22 includes a bar portion 221 and a comb-shaped portion 222 connected in perpendicular to the bar portion 221. Referring to FIG. 10, the comb-shaped structure of the detecting line 24 includes a bar portion 241 and a comb-shaped portion 242 connected in perpendicular to the bar portion 241.

Furthermore, as for the case where the pixel electrode 321 is disposed with the comb-shaped portion 3212, the common electrode 322 is in an integral structure and the detecting line 24 is closer to the liquid crystal layer 4, the touch layer is specifically disposed as follows. The comb-shaped portion 242 of the detecting line 24 is misaligned with respect to the comb-shaped portion 3212 of the pixel electrode 321. Thus, it is avoided that the pixel electrode 321 of the TFT substrate 3 is completely overlapped with the detecting line 24 of the CF substrate 2, thereby reducing the parasitic capacitance.

As for the case where the pixel electrode 321 is disposed with the comb-shaped portion 3212, the common electrode 322 is in an integral structure and the driving line 22 is closer to the liquid crystal layer 4, the touch layer is specifically disposed as follows. The comb-shaped portion 222 of the driving line 22 is misaligned with respect to the comb-shaped portion 3212 of the pixel electrode 321. Thus, it is avoided that the pixel electrode 321 of the TFT substrate 3 is completely overlapped with the driving line 22 of the CF substrate 2, thereby reducing the parasitic capacitance.

In short, the comb-shaped structure of the driving line 22 or the detecting line 24 is at least partially misaligned with respect to the comb-shaped structure of the pixel electrode 321 on the TFT substrate 3 close to the liquid crystal layer 4. Thus, it is avoided that the pixel electrode 321 of the TFT substrate 3 is completely overlapped with the driving line 22 and/or the detecting line 24 of the CF substrate 2, thereby reducing the parasitic capacitance.

It is understood that there are multiple comb-shaped portions 3212 connected to the bar portion 3211 of one pixel electrode 321. However, it should be noted that, for the pixel electrode 321, the multiple connected comb-shaped portions 3212 are not limited to be connected to one bar portion 3211 and may also be connected to multiple bar portions 3211. Correspondingly, for the driving line 22, multiple connected comb-shaped portions 222 are not limited to be connected to one bar portion 221 and may also be connected to multiple bar portions 221. Similarly, for the detecting line 24, the multiple connected comb-shaped portions 242 are not limited to be connected to one bar portion 241 and may also be connected to multiple bar portions 241.

Similarly, the bar portion 221 and the comb-shaped portion 222 form the comb-shaped structure of the driving line 22. The bar portion 241 and the comb-shaped portion 242 form the comb-shaped structure of the detecting line 24. The respective comb-shaped structures are disposed in order to form discontinuous gaps (slits) for the respective integral structures, so as to have opening portions for an electrical field to pass through. Therefore, for other embodiments, both the detecting line 24 and the driving line 22 may have different shapes, as long as discontinuous gaps can be formed respectively for the driving line 22 and the detecting line 24.

In the following, the solution in which the driving line 22 and the detecting line 24 are formed in one touch layer is described.

As shown in FIG. 15, the driving line 22 and the detecting line 24 are separated by a dielectric layer 23. The driving line 22 and the detecting line 24 are separated with each other in one of two ways. 1) The driving line 22 separates the detecting line 24 into separate portions, a first connecting portion (first connecting member) 25 is disposed on the separate portions, the first connecting portion 25 crosses (bridges) the driving line 22 to connect the separate portions of detecting line 24; 2) the detecting line 24 may also separate the driving line 22 into separate portions, a second connecting portion (second connecting member) is disposed on the separate portions and configured to crosses (bridge) the detecting line 24 to connect the separate portions of driving line 22.

In the prior art, each of the driving line 22 and the detecting line 24 is an integral conductive layer. Unlike the prior art, in the fifth embodiment, the driving line 22 or the detecting line 24 is also disposed in a comb-shaped structure. The comb-shaped structure of the driving line 22 includes a bar portion 221 and a comb-shaped portion 222 connected in perpendicular to the bar portion 221. The comb-shaped structure of the detecting line 24 includes a bar portion 241 and a comb-shaped portion 242 connected in perpendicular to the bar portion 241.

Furthermore, as for the case where the pixel electrode 321 is disposed with the comb-shaped portion 3212, the common electrode 322 is in an integral structure and the driving line 22 and the detecting line 24 are disposed in one touch layer, the touch layer is specifically disposed as follows. One of the comb-shaped portion 222 of the driving line 22 and the comb-shaped portion 242 of the detecting line 24 is misaligned with respect to the comb-shaped portion 3212 of the pixel electrode 321, or both of the comb-shaped portion 222 of the driving line 22 and the comb-shaped portion 242 of the detecting line 24 are misaligned with respect to the comb-shaped portion 3212 of the pixel electrode 321. In one embodiment, a completely overlapping of the pixel electrode 321 of the TFT substrate 3 with the detecting line 24 and the driving line 22 of the CF substrate 2 is thus avoided. In another embodiment, the detecting line 24 or the driving line 22 of the CF substrate 2 does not overlap with the pixel electrode 321 of the TFT substrate 3 to reduce parasitic capacitance.

In short, the comb-shaped structure of the driving line 22 or/and the detecting line 24 are at least partially misaligned with respect to the comb-shaped structure of the pixel electrode 321 on the TFT substrate 3 close to the liquid crystal layer 4. Thus it is avoided that the pixel electrode 321 of the TFT substrate 3 is completely overlapped with the driving line 22 and/or the detecting line 24 of the CF substrate 2, thereby reducing the parasitic capacitance.

The above-mentioned misalignment includes partially misalignment and completely misalignment. In order to increase the quantity of electrodes disposed in a plane and to improve utilization rate, the comb-shaped structure of the driving line 22 and/or the detecting line 24 is at least partially complementary to the comb-shaped structure of the common electrode 322 on the TFT substrate 3 close to the liquid crystal layer 4.

Besides the driving line 22 or the detecting line 24 disposed on the surface of the CF substrate 2, a liquid crystal alignment layer made of polyimide may also be disposed on the driving line 22 and/or the detecting line 24.

Preferred embodiments of the present invention are disclosed above, which should not be interpreted as limitation of the present invention. Numerous possible alternations, modifications, and equivalents can be made to the technical solution of the present invention by those skilled in the art in light of the methods and technical content disclosed herein without deviation from the spirit and scope of the present invention. Therefore, any alternations, modifications, and equivalents made to the above-mentioned embodiments according to the technical essential of the present invention without deviation from the scope of the present invention should fall within the scope of protection of the present invention.

What is claimed is:
1. A touch display panel, comprising:
a color film (CF) substrate;
a thin film transistor (TFT) substrate disposed opposite to the CF substrate;
a liquid crystal layer disposed between the CF substrate and the TFT substrate;
a common electrode having a comb-shaped structure and a pixel electrode having a comb-shaped structure disposed on the TFT substrate close to a side of the liquid crystal layer; and
a touch layer disposed on the CF substrate close to another side of the liquid crystal layer and comprising a driving line and a detecting line being insulated from each other;
wherein the driving line and/or the detecting line has a comb-shaped structure which does not overlap with the comb-shaped structure of the common electrode and/or the comb-shaped structure of the pixel electrode,
wherein the common electrode comprises a first bar portion and a plurality of comb-shaped portions connected to the first bar portion in each pixel unit of the TFT substrate, the pixel electrode comprises a third bar portion and a plurality of comb-shaped portions connected to the third bar portion in each pixel unit of the TFT substrate, the driving line and/or the detecting line comprises a second bar portion and a plurality of comb-shaped portions connected to the second bar portion, and both the plurality of comb-shaped portions of the common electrode and the plurality of comb-shaped portions of the pixel electrode are parallel to the plurality of comb-shaped portions of the driving line and/or the detecting line, wherein the first bar portion, the third bar portion and the second bar portion are different from each other,
wherein the plurality of comb-shaped portions of the common electrode does not overlap with the plurality of comb-shaped portion of the pixel electrode, and the plurality of comb-shaped portions of each of the common electrode and the pixel electrode does not overlap with the plurality of comb-shaped portions of the driving line and/or the detecting line, and
wherein,
a projection of one of the plurality of comb-shaped portions of the pixel electrode in a plane and a projection of one of the plurality of comb-shaped portions of the driving line and/or the detecting line in the plane are sandwiched between projections of two adjacent comb-shaped portions of the common electrode in the plane, or
a projection of one of the plurality of comb-shaped portions of the common electrode in a plane and a projection of one of the plurality of comb-shaped portions of the driving line and/or the detecting line in the plane are sandwiched between projections of two adjacent comb-shaped portions of the pixel electrode in the plane, or
a projection of one of the plurality of comb-shaped portions of the common electrode in a plane and a projection of one of the plurality of comb-shaped portions of the pixel electrode in the plane are sandwiched between projections of two adjacent comb-shaped portions of the driving line and/or the detecting line in the plane.

2. The touch display panel according to claim 1, wherein the comb-shaped structure of the driving line and/or the detecting line is complementary to the comb-shaped structure of the common electrode and/or the comb-shaped structure of the pixel electrode.

3. The touch display panel according to claim 1, wherein the driving line and the detecting line are formed substantially perpendicular to each other in a same layer.

4. The touch display panel according to claim 3, wherein the driving line separates the detecting line into separate portions that are connected by a first connecting portion bridging the driving line.

5. The touch display panel according to claim 3, wherein the detecting line separates the driving line into separate portions that are connected by a second connecting portion bridging the detecting line.

6. The touch display panel according to claim 1, wherein the touch layer comprises a first touch layer and a second touch layer being insulated from each other, the driving line being formed in the first touch layer, and the detecting line being formed in the second touch layer.

7. The touch display panel according to claim 6, wherein the second touch layer is closer to the liquid crystal layer than the first touch layer, and the comb-shaped structure of the detecting line is misaligned with respect to the comb-shaped structure of the common electrode and the comb-shaped structure of the pixel electrode.

8. The touch display panel according to claim 6, wherein the first touch layer is closer to the liquid crystal layer than the second touch layer, and the comb-shaped structure of the driving line is misaligned with respect to the comb-shaped structure of the common electrode and the comb-shaped structure of the pixel electrode.

9. The touch display panel according to claim 1, wherein the common electrode is disposed on a surface of the TFT substrate close to the liquid crystal layer.

10. The touch display panel according to claim 1, wherein the pixel electrode is disposed on a surface of the TFT substrate close to the liquid crystal layer.

11. The touch display panel according to claim 1, wherein the common electrode and the pixel electrode are separately disposed on a surface of the TFT substrate close to the liquid crystal layer.

12. The touch display panel according to claim 1, wherein the driving line and the detecting line are made of a transparent material.

13. The touch display panel according to claim 1, wherein the common electrode or the pixel electrode is made of a transparent material.

14. The touch display panel according to claim 12, wherein the material of the driving line and the detecting line is one of indium tin oxide, indium zinc oxide or a combination thereof.

* * * * *